United States Patent
Kao

(10) Patent No.: US 9,235,863 B2
(45) Date of Patent: Jan. 12, 2016

(54) DISPLAY SHOWING INTERSECTION BETWEEN USERS OF A SOCIAL NETWORKING SYSTEM

(75) Inventor: Wayne Kao, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 116 days.

(21) Appl. No.: 13/087,672

(22) Filed: Apr. 15, 2011

(65) Prior Publication Data

US 2012/0266081 A1 Oct. 18, 2012

(51) Int. Cl.
*G06F 3/01* (2006.01)
*G06Q 50/00* (2012.01)

(52) U.S. Cl.
CPC .................................. *G06Q 50/01* (2013.01)

(58) Field of Classification Search
USPC ......................................................... 715/751
See application file for complete search history.

(56) References Cited

U.S. PATENT DOCUMENTS

| | | | | |
|---|---|---|---|---|
| 7,069,308 B2* | 6/2006 | Abrams | ..................... | 709/218 |
| 7,107,264 B2* | 9/2006 | Lu | ..................... | 1/1 |
| 7,124,372 B2* | 10/2006 | Brin | ..................... | 715/751 |
| 7,234,117 B2* | 6/2007 | Zaner et al. | ..................... | 715/758 |
| 7,512,612 B1* | 3/2009 | Akella et al. | ..................... | 1/1 |
| 7,529,797 B2* | 5/2009 | Tseng et al. | ..................... | 709/204 |
| 7,539,697 B1* | 5/2009 | Akella et al. | ..................... | 1/1 |
| 7,725,492 B2* | 5/2010 | Sittig et al. | ..................... | 707/784 |
| 7,797,642 B1* | 9/2010 | Karam et al. | ..................... | 715/810 |
| 7,840,903 B1* | 11/2010 | Amidon et al. | ..................... | 715/757 |
| 7,886,024 B2* | 2/2011 | Kelly et al. | ..................... | 709/219 |
| 7,890,871 B2* | 2/2011 | Etkin | ..................... | 715/738 |
| 7,945,600 B1* | 5/2011 | Thomas et al. | ..................... | 707/804 |
| 8,014,763 B2* | 9/2011 | Hymes | ..................... | 455/414.2 |
| 8,055,664 B2* | 11/2011 | Baluja et al. | ..................... | 707/749 |
| 8,073,839 B2* | 12/2011 | Rathod | ............. | G06F 17/30867 707/640 |
| 8,121,999 B2* | 2/2012 | Hansen | ............... | G06F 17/3087 707/706 |
| 8,171,128 B2* | 5/2012 | Zuckerberg et al. | ......... | 709/224 |
| 8,180,852 B2* | 5/2012 | Lee et al. | ..................... | 709/218 |
| 8,224,773 B2* | 7/2012 | Spiegel | ................. | G06Q 30/02 707/609 |
| 8,244,721 B2* | 8/2012 | Morris et al. | ................. | 707/723 |

(Continued)

FOREIGN PATENT DOCUMENTS

WO WO2011/002588 A1 1/2011

OTHER PUBLICATIONS

'What is Tagging' article in about.com in http://web.archive.org/web/20090328041641/http://graphicssoft.about.com/od/glossary/a/tagging.htm?, dated Mar. 28, 2009, last accessed Mar. 7, 2013.*

(Continued)

*Primary Examiner* — Jessica Chuang
(74) *Attorney, Agent, or Firm* — Fenwick & West LLP

(57) ABSTRACT

A social networking system generates a friendship page that displays social graph data common to two or more social networking system users. A user requests the page by identifying two or more social networking system. The social networking system obtains social graph data common to the identified social networking system users and generates a friendship page containing that social graph data. The obtained social graph data may include interactions between each of the identified user and/or social networking system objects with which each of the identified users has interacted. Examples of the types of social graph data may include photos, videos, communications, content items, events, locations, friends, family members, biographical data, and location data. The friendship page may be displayed to the requesting user in a web browser or in a native application.

19 Claims, 4 Drawing Sheets

(56) References Cited

U.S. PATENT DOCUMENTS

| | | | |
|---|---|---|---|
| 8,244,848 B1* | 8/2012 | Narayanan et al. | 709/223 |
| 8,271,524 B2* | 9/2012 | Firminger | G06Q 10/109 600/301 |
| 8,296,175 B2* | 10/2012 | Dey et al. | 705/7.29 |
| 8,306,922 B1* | 11/2012 | Kunal et al. | 705/319 |
| 8,311,950 B1* | 11/2012 | Kunal et al. | 705/319 |
| 8,346,896 B2* | 1/2013 | Brownholtz et al. | 709/220 |
| 8,380,796 B2* | 2/2013 | Robertson et al. | 709/206 |
| 8,396,467 B2* | 3/2013 | Bonnefoy | H04W 4/023 455/414.1 |
| 8,449,361 B2* | 5/2013 | Laycock et al. | 463/9 |
| 8,533,269 B2* | 9/2013 | Brown | 709/205 |
| 8,549,072 B2* | 10/2013 | Zhu et al. | 709/204 |
| 8,554,723 B2* | 10/2013 | Spiegel | 707/609 |
| 8,560,385 B2* | 10/2013 | Atazky | H04L 12/588 705/14.11 |
| 8,640,257 B1* | 1/2014 | Sherrets et al. | 726/28 |
| 8,712,861 B2* | 4/2014 | Calabria | G06Q 10/10 705/26.1 |
| 8,756,163 B2* | 6/2014 | Schleier-Smith | G06Q 30/02 705/319 |
| 2006/0004914 A1* | 1/2006 | Kelly et al. | 709/219 |
| 2006/0048059 A1* | 3/2006 | Etkin | 715/745 |
| 2006/0218111 A1* | 9/2006 | Cohen | 706/45 |
| 2007/0132767 A1* | 6/2007 | Wright et al. | 345/475 |
| 2007/0156726 A1* | 7/2007 | Levy | 707/100 |
| 2007/0174389 A1* | 7/2007 | Armstrong et al. | 709/204 |
| 2007/0192352 A1* | 8/2007 | Levy | 707/102 |
| 2007/0214141 A1* | 9/2007 | Sittig et al. | 707/7 |
| 2007/0250791 A1* | 10/2007 | Halliday et al. | 715/808 |
| 2008/0040474 A1* | 2/2008 | Zuckerberg et al. | 709/224 |
| 2008/0046458 A1* | 2/2008 | Tseng et al. | 707/102 |
| 2008/0051033 A1* | 2/2008 | Hymes | 455/47 |
| 2008/0222127 A1* | 9/2008 | Bergin | 707/5 |
| 2008/0243532 A1* | 10/2008 | Leach et al. | 705/1 |
| 2008/0250332 A1* | 10/2008 | Farrell et al. | 715/753 |
| 2009/0070286 A1* | 3/2009 | Liss et al. | 707/1 |
| 2009/0070294 A1* | 3/2009 | Chijiiwa | 707/3 |
| 2009/0070665 A1* | 3/2009 | Chijiiwa et al. | 715/235 |
| 2009/0165107 A1* | 6/2009 | Tojo et al. | 726/7 |
| 2009/0187624 A1* | 7/2009 | Brownholtz et al. | 709/204 |
| 2009/0187865 A1* | 7/2009 | Brownholtz et al. | G06F 17/30873 715/854 |
| 2009/0198562 A1* | 8/2009 | Wiesinger et al. | 705/10 |
| 2009/0198662 A1* | 8/2009 | Prabhakar et al. | 707/3 |
| 2009/0204599 A1* | 8/2009 | Morris et al. | 707/5 |
| 2009/0248635 A1* | 10/2009 | Gross | 707/3 |
| 2009/0248709 A1* | 10/2009 | Fuhrmann et al. | 707/100 |
| 2009/0271284 A1* | 10/2009 | Arbib | 705/26 |
| 2009/0282002 A1* | 11/2009 | Reeder et al. | 707/3 |
| 2009/0293079 A1* | 11/2009 | Mckee | G06Q 10/105 725/10 |
| 2009/0319618 A1* | 12/2009 | Affronti et al. | 709/206 |
| 2009/0319914 A1* | 12/2009 | Roseway et al. | 715/753 |
| 2010/0017474 A1* | 1/2010 | Kandekar et al. | 709/205 |
| 2010/0132049 A1* | 5/2010 | Vernal et al. | 726/27 |
| 2010/0153411 A1* | 6/2010 | Toebes et al. | 707/758 |
| 2010/0174709 A1* | 7/2010 | Hansen et al. | 707/728 |
| 2010/0223381 A1* | 9/2010 | Tojo et al. | 709/225 |
| 2010/0241580 A1* | 9/2010 | Schleier-Smith | 705/319 |
| 2010/0268655 A1* | 10/2010 | Cheuoua | 705/319 |
| 2011/0010384 A1* | 1/2011 | Luo et al. | 707/769 |
| 2011/0022621 A1* | 1/2011 | Luo et al. | 707/769 |
| 2011/0035677 A1* | 2/2011 | Vitale et al. | 715/751 |
| 2011/0041084 A1* | 2/2011 | Karam | 715/753 |
| 2011/0078018 A1* | 3/2011 | Chunilal | 705/14.48 |
| 2011/0093784 A1* | 4/2011 | Kiraz et al. | 715/719 |
| 2011/0099486 A1* | 4/2011 | Nesladek et al. | 715/753 |
| 2011/0112821 A1* | 5/2011 | Basso et al. | 704/2 |
| 2011/0113133 A1* | 5/2011 | Kelly et al. | 709/223 |
| 2011/0119596 A1* | 5/2011 | Nesladek et al. | 715/739 |
| 2011/0161835 A1* | 6/2011 | Karam | 715/753 |
| 2011/0173570 A1* | 7/2011 | Moromisato et al. | 715/838 |
| 2011/0196863 A1* | 8/2011 | Marcucci et al. | 707/728 |
| 2011/0196922 A1* | 8/2011 | Marcucci et al. | 709/204 |
| 2011/0196923 A1* | 8/2011 | Marcucci et al. | 709/204 |
| 2011/0196924 A1* | 8/2011 | Hargarten et al. | 709/204 |
| 2011/0225293 A1* | 9/2011 | Rathod | 709/224 |
| 2011/0231240 A1* | 9/2011 | Schoen et al. | 705/14.41 |
| 2011/0252320 A1* | 10/2011 | Arrasvuori et al. | 715/704 |
| 2011/0276632 A1* | 11/2011 | Anderson et al. | 709/205 |
| 2011/0307695 A1* | 12/2011 | Slater | 713/163 |
| 2012/0011432 A1* | 1/2012 | Strutton | 715/234 |
| 2012/0023417 A1* | 1/2012 | Nesladek et al. | 715/753 |
| 2012/0042258 A1* | 2/2012 | Etkin | 715/738 |
| 2012/0047150 A1* | 2/2012 | Spiegel | 707/748 |
| 2012/0078882 A1* | 3/2012 | Boldyrev et al. | 707/722 |
| 2012/0129585 A1* | 5/2012 | Laycock et al. | 463/9 |
| 2012/0131609 A1* | 5/2012 | Fernandez Gutierrez et al. | 725/34 |
| 2012/0131610 A1* | 5/2012 | Fernandez Gutierrez et al. | 725/34 |
| 2012/0136852 A1* | 5/2012 | Geller | 707/722 |
| 2012/0151383 A1* | 6/2012 | Kazan et al. | 715/753 |
| 2012/0158844 A1* | 6/2012 | Pulito et al. | 709/204 |
| 2012/0174032 A1* | 7/2012 | Greene | G06Q 30/02 715/811 |
| 2012/0203832 A1* | 8/2012 | Vastardis et al. | 709/204 |
| 2012/0210250 A1* | 8/2012 | Svendsen et al. | 715/753 |
| 2012/0226651 A1* | 9/2012 | Chidlovskii | 706/52 |
| 2012/0233256 A1* | 9/2012 | Shaham et al. | 709/204 |
| 2012/0250951 A1* | 10/2012 | Chen | 382/118 |
| 2012/0259975 A1* | 10/2012 | Le et al. | 709/224 |
| 2012/0278317 A1* | 11/2012 | Spiegel | 707/731 |
| 2012/0278388 A1* | 11/2012 | Kleinbart et al. | 709/204 |
| 2013/0024473 A1* | 1/2013 | Krishnan et al. | 707/769 |
| 2013/0173531 A1* | 7/2013 | Rinearson et al. | 707/608 |
| 2013/0191458 A1* | 7/2013 | Krishnan et al. | 709/204 |
| 2013/0262579 A1* | 10/2013 | Chandler | 709/204 |
| 2013/0262586 A1* | 10/2013 | Chan et al. | 709/204 |
| 2013/0273987 A1* | 10/2013 | Laycock et al. | 463/9 |
| 2014/0108427 A1* | 4/2014 | Spiegel | 707/748 |
| 2014/0279067 A1* | 9/2014 | Lei | 705/14.73 |

OTHER PUBLICATIONS

Patent Cooperation Treaty, International Search Report and Written Opinion, International Patent Application No. PCT/US2012/031163, Jun. 29, 2012, 11 pages.

* cited by examiner

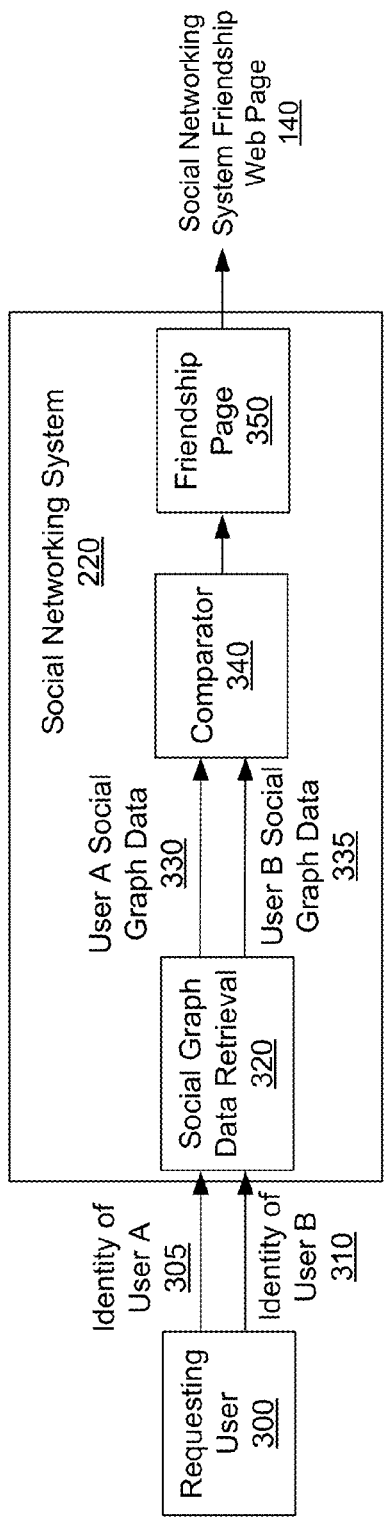
FIG. 3
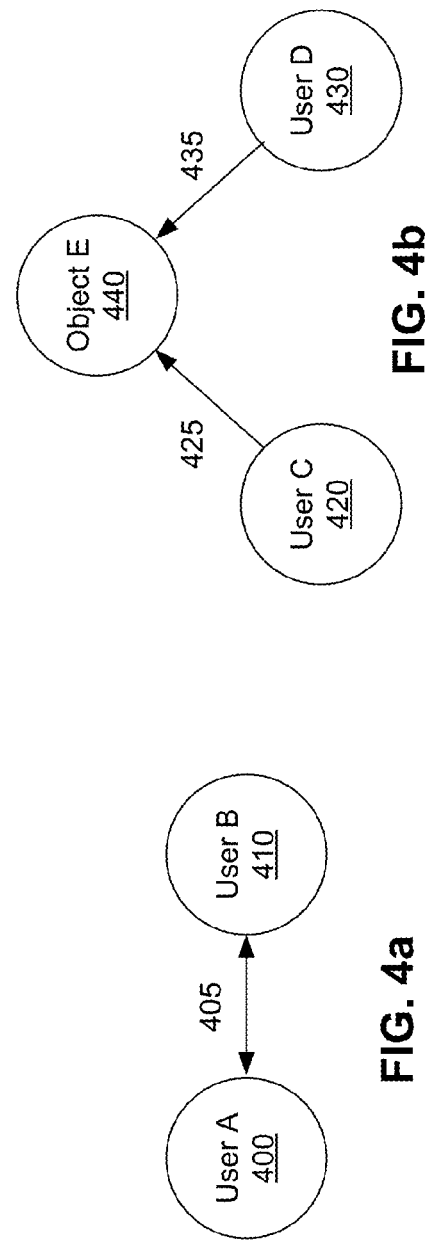
FIG. 4b
FIG. 4a

DISPLAY SHOWING INTERSECTION BETWEEN USERS OF A SOCIAL NETWORKING SYSTEM

BACKGROUND

This invention relates generally to social networking, and in particular to providing a social networking system page or other display comprising social networking system information common to multiple users.

Social networking systems commonly provide mechanisms allowing users to interact within their social networks. A social networking system user may be an individual or any other entity, such as a business or other non-person entity. Social networking system information that is tracked and maintained by a social networking system may be stored as a social graph, which includes a plurality of nodes that are interconnected by a plurality of edges. A social graph node may represent a social networking system object that can act on and/or be acted upon by another node. A social networking system object may be, for example, a social networking system user, non-person entities, content items, groups, social networking system pages, events, messages, concepts or other social networking system objects, such as movies, bands, or books.

An edge between nodes in a social graph represents a particular kind of connection between the nodes, which may result from an action that was performed by one of the nodes on the other node. Examples of such actions by a social networking system user include listing social networking system objects in a user profile, subscribing to or joining a social networking system group or fan page, sending a message to another social networking system user, making a purchase associated with a social networking system node, commenting on a content item, or RSVP'ing to an event. Thus, if a first user establishes a connection with a second user in the social networking system, the users may be represented by nodes, and the connection may be represented by an edge connecting the nodes. Further, if the first user sends a message to the second user, or tags the second user in a picture stored by the social networking system, the message and tagging may be represented by additional edges between the nodes. Alternatively, the message and picture may be represented by nodes, which are connected by edges to the nodes representing the first and second user. A social graph, therefore, may be used to track the interactions between social networking system objects.

A first social networking system user may want to view some or all of the social graph data, such as social networking system objects and interactions, between or common to a second social networking system user (referred to herein as "relationship data"). Current social networking systems contain interfaces for viewing certain selected communications between two social networking system users, but only in specialized circumstances and only of one particular type of communications. Further, social networking systems contain pages that display limited types of social networking system information in small quantities generally related to one or more social networking system users, but do not contain pages which comprehensively list social graph data common to multiple social networking system users. Social graph data common to multiple social networking system users is decentralized and spread across multiple social networking system pages, which may require navigation that is prohibitively time-consumptive. Thus, there is a need for a solution that aggregates social graph data common to multiple social networking system users and that presents this aggregated data in a single interface to provide an enjoyable, useful, and efficient experience for social networking system users.

SUMMARY

Users of a social networking system may request a friendship page containing social information related to two or more social networking system users. The social information in the friendship page may be maintained in a social networking system data store, and it may comprise information about a plurality of social networking system users, a plurality of relationships among the users, and a plurality of actions of the users. To request a friendship page, a viewing user may identify to the social networking system two or more users, one of which may include the viewing user. The social networking system obtains social information related to each of the identified users and generates a friendship page, which contains at least a portion of the obtained social information that is related to each of the identified users. The generated friendship page is then sent to the device of the viewing user for display. In this way, the viewing user can conveniently access social information that is related to each of the identified users, the interactions between the users, and/or the objects with which each of the users has interacted.

BRIEF DESCRIPTION OF THE DRAWINGS

FIG. 3 is a block diagram illustrating one embodiment of the invention in which a requesting user identifies social networking system users and the social networking system produces a social networking system page containing relationship data for the identified users.

FIG. 4a is a block diagram illustrating two connected social networking system users in a social networking system social graph, according to one embodiment.

FIG. 4b is a block diagram illustrating two social networking system users connected to the same social networking system social graph node, according to one embodiment.

Figure 1:
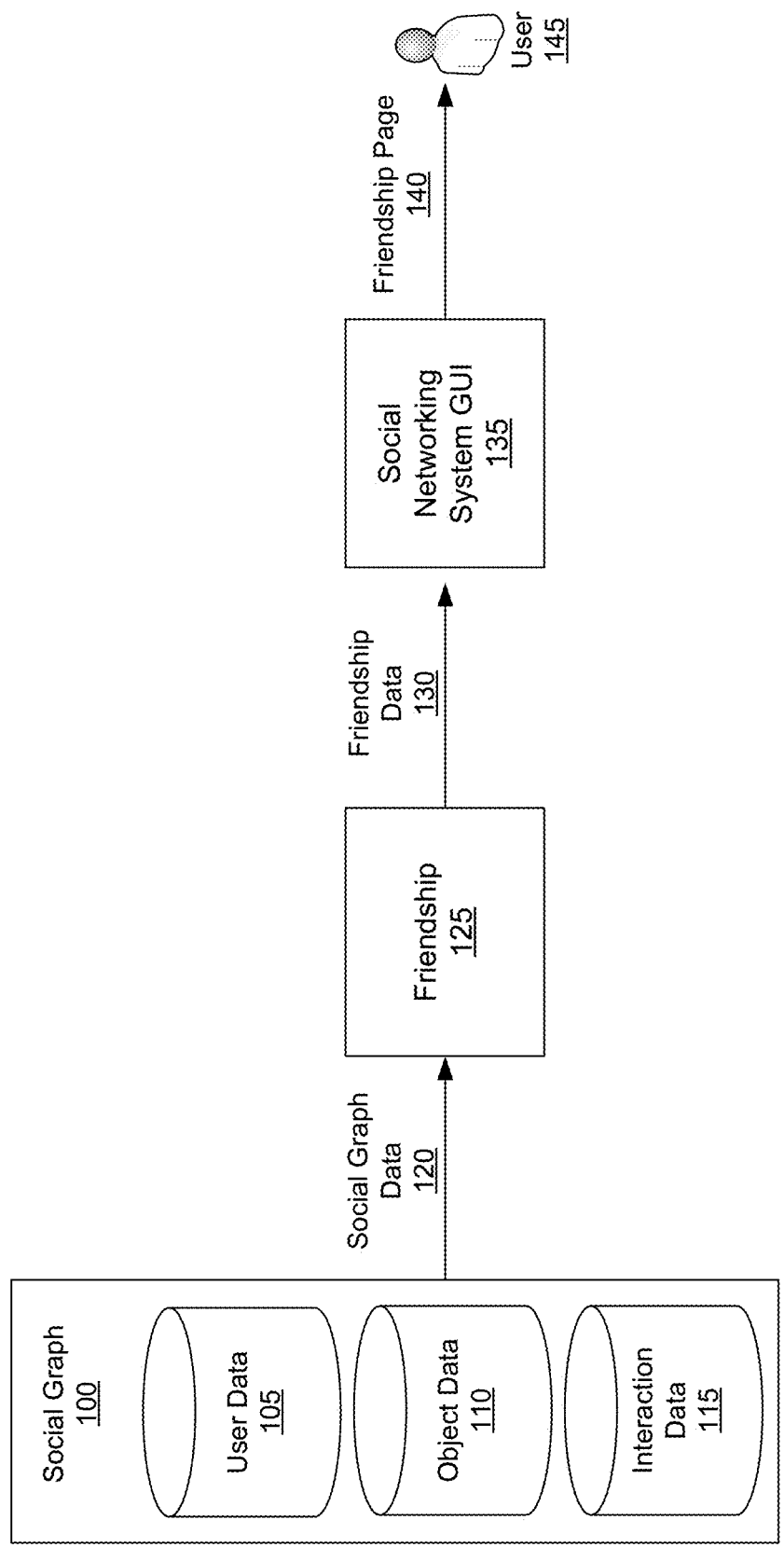
FIG. 1 is a diagram of a process for providing social networking system relationship data in a social networking system page, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Social networking systems commonly provide mechanisms allowing users to interact with objects and other users both within and external to the context of the social networking system. A social networking system user may be an individual or any other entity, such as a business or other non-person entity. The social networking system may utilize a web-based interface comprising a series of inter-connected pages displaying and allowing users to interact with social networking system objects and information. For example, a social networking system may display a page for each social networking system user comprising objects and information entered by or related to the social networking system user (e.g., the user's "profile"). Social networking systems may also contain pages containing pictures or videos, dedicated to concepts, dedicated to users with similar interests ("groups"), or containing communications or social networking system activity to, from or by other users. Social networking system pages may contain links to other social networking system pages, and may include additional capabilities such as search, real-time communication, content-item uploading, purchasing, advertising, and any other web-based technology or ability. It should be noted that a social networking system interface may be accessible from a web browser or a non-web browser application, such as a dedicated social networking system mobile device or computer application. Accordingly, "page" as used herein may be a web page, an application interface or display, a widget displayed over a web page or application, a box or other graphical interface, an overlay window on another page (whether within or outside the context of a social networking system), or a web page external to the social networking system with a social networking system plug in or integration capabilities.

Social networking system information that is tracked and maintained by a social networking system may be stored as a social graph, which includes a plurality of nodes that are interconnected by a plurality of edges (representing interactions, connections, communications or other measures of relatedness between nodes). A social graph node may represent a social networking system object that can act on and/or be acted upon by another node. An edge between nodes in a social graph represents any kind of connection or interaction between the two nodes, which may result from an action that was performed by one of the nodes on the other node. In this description, reference to an edge connecting two objects in a social graph is intended to refer to an edge connecting the nodes representing each of the two objects.

FIG. 4a is a block diagram illustrating two connected social networking system users in a social networking system social graph, and FIG. 4b is a block diagram illustrating two social networking system users connected to the same social networking system social graph node, according to one embodiment. In FIG. 4a, user A is represented by node 400, user B is represented by node 410, and edge 405 connects node 400 and node 410, representing a connection between user A and user B. In FIG. 4b, user C is represented by node 420, user D is represented by node 430, and object E is represented by node 440. Edge 425 connects nodes 420 and 440, representing a connection between user C and object E, and edge 435 connects nodes 430 and 440, representing a connection between user D and object E. Users A and B are said to have established a connection to each other, and users C and D are said to have established a connection to a common node. An additional edge (not shown) may also connect node 420 and node 430. FIG. 4a and FIG. 4b are meant merely to be illustrative; any method of establishing and/or storing connections, interactions, users and objects may be utilized, as discussed in greater detail below.

A social networking system object may be a social networking system user, non-person entity, content item, group, social networking system page, location, application, concept or other social networking system object, such as a movie, a band, or a book. Content items may be anything that a social networking system user or other object may create, upload, edit or interact with, such as messages, queued messages (e.g., email), text and SMS (short message service) messages, comment messages, messages sent using any other suitable messaging technique, an HTTP link, HTML files, images, videos, audio clips, documents, document edits, calendar entries or events, and other computer-related files. Each social networking system object may be represented by a distinct social networking system node in a social graph.

Online social networking systems allow users to associate themselves and establish connections with other users of the social networking system. When two users establish a connection, they become "friends" (or, "connections") within the context of the social networking system. Being friends in a social networking system may allow users access to more information about each other than would otherwise be available to unconnected users. For instance, being friends may allow a user to view another user's profile, to see another user's friends, or to view pictures of another user. Likewise, becoming friends within a social networking system may allow a user greater access to communicate with another user, such as by email (internal and external to the social networking system), instant message, text message, phone, or any other communicative interface. Finally, being friends may allow a user access to view, comment on, download, endorse or otherwise interact with another user's uploaded content items. Establishing connections, accessing user information, communicating, and interacting within the context of the social networking system may be represented by an edge between the nodes representing two social networking system users. If a first user comments on a second user's shared HTTP link, an edge may connect the first user's node and the shared link's node, or an edge may connect the first user's node and the second user's node, or both.

Users of social networking systems may also interact with non-user objects within the social networking system, for instance, objects displayed on or contained within a social networking system page. This interaction may take a variety of forms, such as communicating with or about or commenting on an object, clicking a button or link associated with approval (such as a "like" button), sharing a social networking system object with other users, downloading or merely viewing a social networking system object, uploading an object, linking to an object, tagging an object, editing an object, playing an object, accessing an object, or by any other suitable means for interaction. Further, a user may interact with a group or fan page object by forming or joining groups, or becoming a fan of a fan page. Interactions with non-user objects may also be represented by edges connecting a user's node and an object node in a social graph. Finally, a social networking system user may interact with social networking system objects outside of the context of the social networking system's pages that are connected to or associated with the social networking system. For instance, an article on a news web site might have a "like" button that users of the social networking system can click on to express approval of the article. Likewise, a company's website may provide the ability to join a social networking system group dedicated to the company directly from the company's website. In such instances, an edge may connect a user and a social networking system node representing the externally-hosted news article or the external company website.

A social networking system may allow a user to establish a variety of connections with another user. For example, users may establish various personal relationships with another user in a social networking system, such as a friendship, a romantic relationship (such as dating, engagement, or marriage), or a familial relationship (such as parent/child, grandparent/grandchild, aunt/uncle/niece/nephew, or cousin). In addition, users may establish non-personal relationships, such as employee/employer/co-worker or student/teacher/classmate. A social networking system may also allow a user to establish details of relationships, such as anniversaries or other relationship milestones. Each type of established connection may be represented by an edge in the social graph, and more than one edge may connect two users with an established relationship. For example, if two users are cousins and co-workers, a first edge may connect the users for establishing a connection in the social networking system, a second edge may connect the users for indicating that they are cousins, and a third edge may connect the users for indicating that they are co-workers.

A social networking system may allow users to communicate both within and external to the social networking system. For example, a first user may send a second user a message within the social networking system, an email through the social networking system, an email external to but originating from the social networking system, an instant message within the social networking system, and an instant message external to but originating from the social networking system. Further, a first user may comment on the profile page of a second user, or may comment on objects associated with a second user, such as content items uploaded by the second user. The social networking system may store these communications, and each communication may be represented by a node in the social graph. Communicating users may be connected to each other by an edge in the social graph, or they may be connected by an edge to a communication node.

A social networking system may allow a user to upload pictures. Each picture may also be represented by a node in the social graph, and an edge connects the user who uploaded the picture to the picture. The social networking system may allow users to tag pictures by associating a picture or a location within the picture with the identity of a social networking system user. For example, a first user may recognize that an uploaded picture is an image of several friends, and may associate the identities of each friend with the location within the image of each friend's face. In addition, the social networking system may allow users to comment on, link to, communicate about or edit the picture. In the social graph, an edge may connect users who have viewed, tagged, been tagged in, commented on, linked to, communicated about, or edited the picture to the node representing the picture. Likewise, an edge may connect users who have performed similar interactions with or been tagged in a video to the node representing the video.

A social networking system may allow a user to recommend a social networking system object to another user. For example, a first user may recommend that a second user view a content item, attend an event, establish a connection with another user, or a join group through the social networking system interface. An edge may connect the first user and the second user, and may connect the first user and the second user to the recommended object. A second edge may connect the social networking system object to the second user if the second user accepts the recommendation.

A social networking system may allow users to create and schedule events. An event may have an associated real-world location, such as a concert, a party, a parade, or a sporting event, or may not have a real-world location, such as an online fundraising drive or an online sale. A social networking system may allow users to utilize social networking system calendar functionality when creating events, invite other users, create event descriptions, and utilize social networking system location functionality. Edges may connect the user who created the event, the users invited to the event, and the event itself. A second edge may connect the event to users who RSVP to the event, and a third edge may connect the event to users who use location-based functionality to check in to the event (for instance, users who use a social networking system application on a mobile phone with location-detection functionality at the time of the event to indicate that they are in attendance of the event). Similarly, an edge may connect a user to any location the user checks in to using location-detection functionality.

A social networking system may allow a user to enter and display information related to the user's interests, education and work experience, contact information, and other biographical information in the user's profile page. Each school, employer, interest (for example, music, books, movies, television shows, games, political views, philosophy, religion, groups, or fan pages), geographical location, network, or any other information contained in a profile page may be represented by an object in the social graph. Further, an edge may connect a user with any object representing information in the user's profile page. For example, if in a profile page a user indicates attendance at "the University of Idaho", lists "Anchorman" as a favorite movie, and lists "Post Falls, Id." as a hometown, the user may be connected by an edge to objects representing the University of Idaho, Anchorman, and Post Falls, Id.

FIG. 1 is a diagram of a process for providing social networking system relationship data in a social networking system page, according to one embodiment. FIG. 1 illustrates a social graph storage module 100, a friendship module 125, a social networking system GUI module 135, and a social networking system user 145. The social graph storage module 100 further comprises user data storage module 105, object data storage module 110, and interaction data storage module 115.

Social graph data 120 is retrieved by friendship module 125 from social graph storage module 100. Social graph node data is received from user data storage module 105, which stores information related to social networking system users, and object data storage module 110, which stores information related to social networking system objects. Social graph edge data is received from interaction data storage module 115, which stores information related to the interactions and connections between social graph nodes.

Friendship module 125 selects social graph data 120 relevant to two or more social networking system users and outputs this selected data as friendship data 130. Social networking system graphical user interface (GUI) module 135 receives friendship data 130 and produces social networking system friendship page 140, which may be displayed to a user 145. Social networking system GUI module 135 may receive friendship data 130 and format it into a pre-determined or dynamic social networking system form. In one embodiment, social networking system friendship page 140 comprises a web page presented within a social networking system, which may utilize a social networking system interface and which may be viewable through a web browser. In an alternative embodiment, social networking system friendship page 140 comprises a page formatted for viewing through a non-browser application, such as a social networking system mobile phone application. In another embodiment, the social networking system friendship page 140 is displayed in a web page or application external to the social networking system using, for instance, a social networking system plug in or interface capability. Further, social networking system GUI module 135 may organize received friendship data 130 in a pre-determined or dynamic form. For example, social networking system GUI module 135 may display pictures at the top and common friends in the margin of friendship page 140.

Alternatively, items may be displayed chronologically or in any other pre-determined order, or may be displayed according to a dynamic weighting based on relevance.

In one example, social graph data 120 comprises all node and edge data stored in social graph storage module 100 related to two identified social networking system users. Examples of related social graph data 120 include object data listed in the identified users' profiles, pictures in which the identified users' are tagged, communications made by the identified users, and friends of the identified users. In this example, the friendship module 125 may select the received social graph data 120 relevant to both of the identified users. Examples of relevant social graph data include object data listed in both identified users' profiles, pictures in which both identified users are tagged, communications made between the identified users, and friends common to both identified users. Continuing this example, social networking system GUI module 135 may format this information in such a way that pictures which both identified users are tagged in are displayed at the top of friendship page 140 and are weighted by relevance. Friends common to both identified users are listed in the left hand margin of friendship page 140, also weighted by relevance. Communications between the identified users are displayed on friendship page 140 chronologically below the pictures, and objects common to both identified users are listed below the communications on friendship page 140.

System Architecture

Figure 2:
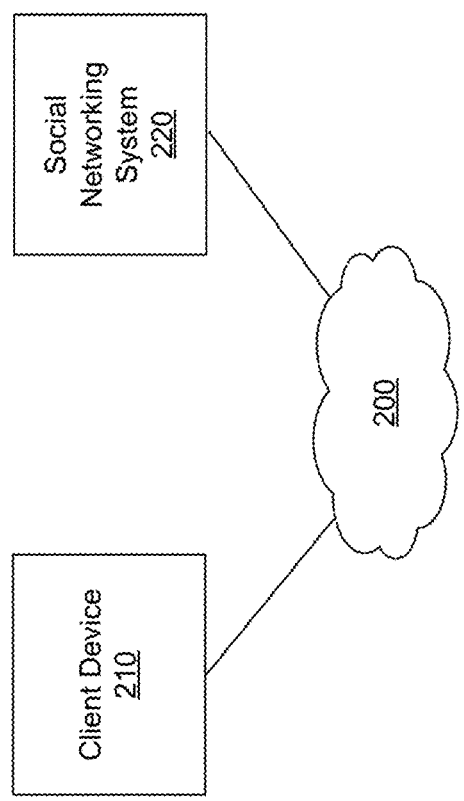
FIG. 2 is a high level block diagram of a system environment suitable for providing social networking system relationship data in a social networking system page, according to one embodiment.

FIG. 2 is a high level block diagram of a system environment suitable for providing social networking system relationship data in a social networking system page, according to one embodiment. The system environment comprises a client device 210 and a social networking system 220 that communicate through a connecting network 200. The connecting network may be the Internet, a local area network, or any other network that allows communication between modules. The connecting network 200 may use standard communications technologies and/or protocols. In alternative configurations, different and/or additional modules can be included in the system.

Client device 210 may comprise any type of computing device capable of sending or receiving social networking system content, such as a mobile phone, laptop, desktop, netbook, tablet, cable box, or television. Although only one client device 210 is shown in FIG. 2, any number of client devices may be connected to and communicate with social networking system 220 at a time. A user of the client device 210 interacts with the social networking system 220 via an application, such as a web browser or a native application, to perform social networking system operations such as browsing content, posting and sending messages, establishing connections with other users, and the like.

The social networking system 220 may comprise a plurality of pages hosted on one or more web servers. The plurality of pages may present social networking system information. For example, these pages may include pages for user profiles, group profiles, fan pages, and other social networking system-related pages. These pages may include a variety of social networking system data, such as personal information, user settings, group settings, search results, and advertisements, as well as object and interaction data, including but not limited to user actions, profile information, relationship information, communication information, group information, fan page information, endorsement information, and content items.

Social networking system data, such as social graph data, is stored in one or more social networking system databases. These databases and all other social networking system components can communicate with user device 210 via connecting network 200 through the social networking system web servers. The databases may provide social networking system object data, interaction data or any other social networking system data when by requested by another social networking system component or client device 210.

Operation

FIG. 3 is a block diagram illustrating one embodiment of the invention in which a requesting user identifies social networking system users, and the social networking system 220 produces a social networking system page containing relationship data (hereinafter, a "friendship page") for the identified users. A requesting user 300 identifies at least two social networking system users to the social networking system 220. In one embodiment, this comprises transmitting the identity of user A 305 and the identity of user B 310 to the social networking system 220. The requesting user 300 may request a friendship page for the relationship between the requesting user 300 and another user, or between two other users. As will be discussed below, a friendship page may be requested and produced for more than two social networking system users. It should be emphasized that, as discussed above, a user may be a business or other non-person entity, such as a location. For example, a person may request a friendship page for himself and another person user, for two other person users, for himself and a business, for a business and another person user, or for two businesses. Likewise, a business or other non-person entity may request a friendship page for the business and a person user, for two person users, etc.

The requesting user 300 may utilize a social networking system interface to request the friendship page. In one embodiment, a social networking system interface or page may contain a "see friendship page" link or button, or the equivalent, on another social networking system user's profile which a requesting user 300 can click or select to request a friendship page. In this example, the identities of the requesting user 300 and the other user are transmitted to social networking system 220. In an alternative embodiment, a social networking system interface may allow a requesting user 300 to select two social networking system users, for instance friends of the requesting user 300, from a list, drop-down menu, or search interface. In this example, the identities of the selected social networking system users are transmitted to social networking system 220.

A friendship page may be generated automatically, without the explicit request of a user. For example, a user may view the profile page of a friend, and a segment of the friend's profile page interface may display social information related to the user and the friend. In such instances, the viewing user is the requesting user although the user has not expressly requested a friendship page. Likewise, if a third-party web page detects that two users are viewing the third-party web page simultaneously, the web page may display social information related to both users in a segment or portion of the web page.

Social networking system 220 receives the identity of user A 305 and the identity of user B 310 from requesting user 300. Social graph data retrieval module 320 retrieves social graph data related to user A 330 and social graph data related to user B 335. Social graph data may be retrieved from social networking system databases and may comprise objects and interactions related to user A and objects and interactions related to user B in the form of social graph nodes and edges. In one embodiment, all social graph data related to users A and B is retrieved. In another embodiment, only certain categories of social graph data are retrieved, such as communications and pictures. In yet another embodiment, only a subset of social graph data is retrieved, such as social graph data generated after a certain point in time, social graph data exceeding a certain measure of relevance, or social graph data subject to any other suitable metric.

Comparator 340 receives social graph data related to user A and user B from social graph data retrieval module 320 and selects social graph data common to both user A and user B as relationship data. In one embodiment, comparator 340 selects all social graph data common to both user A and user B as relationship data. In an alternative embodiment, only a subset of social graph data common to both user A and user B is selected as relationship data, such as social graph data subject to time, relevance or other suitable restrictions.

Comparator 340 may select social graph data common to both user A and user B as relationship data in a variety of ways. In one embodiment, comparator 340 selects edges that connect the nodes of both user A and user B as relationship data, similar to the embodiment of FIG. 4*a*. For example, a brother-sister relationship may be represented by an edge connecting user A and user B, and comparator 340 may select the brother-sister edge as relationship data. In one embodiment, comparator 340 selects nodes which users A and B are both connected to by edges as relationship data, similar to the embodiment of FIG. 4*b*. For example, if a particular novel is listed in user A's profile and user B posted a review of the novel to a social networking system message board, both user A and user B may be connected to the node representing the novel by edges, and comparator 340 may the select the novel's node as relationship data. Although other suitable methods of selecting social graph data common to both user A and user B be implemented, the remainder of this description assumes that comparator 340 selects edges between the nodes of user A and user B, and nodes which the nodes of user A and user B are connected to by edges, as relationship data.

In one embodiment, comparator 340 selects content items that both user A and user B have interacted with. For example, comparator 340 may select a picture that both user A and user B have been tagged in by either user A, user B or a third user. Similarly, comparator 340 may select a video that both user A and B have communicated about, that both user A and B have endorsed or "liked," or any other form of interaction as discussed above. In one embodiment, comparator 340 may select a content item that user A and user B have interacted with in different ways. For example, a document may be selected that user A uploads and user B edits, or an HTTP link may be selected that user A recommends and user B views.

In one embodiment, comparator 340 selects communications made between user A and user B. For example, comparator 340 may select posts by user A on user B's wall and vice versa, email messages sent between user A and user B, email messages sent by a third party to both user A and user B, instant messages sent between user A and user B, instant messages sent by a third party to both user A and user B, or any other format of communication between user A and user B or to both user A and user B.

In one embodiment, comparator 340 selects other social networking system users with whom both user A and user B have established a connection (i.e.,"friends in common"). For example, comparator 340 may select friends, family members, co-workers or classmates of both user A and user B. Likewise, comparator 340 may select social networking system users with whom both user A and user B have communicated. For example, if both user A and user B comment on a content item uploaded by user C, or if both user A and user B post a comment on user C's profile, comparator 340 may select user C. Further, comparator 340 may select information related to established connections. For example, comparator 340 may select an anniversary for two users in a romantic relationship, a child's birthday for a parent-child relationship, or a date that two social networking system users established a connection via the social networking system 220.

In one embodiment, comparator 340 selects biographical information common to both user A and user B. For example, comparator 340 may select a common school (such as a high school, grade school, college or professional school), a common employer (past or present), a common hometown, a common current town of residence, a common zodiac sign, common membership in organizations or groups (internal or external to the social networking system 220), common fan page subscriptions, a common network, or any other common biological information. Similarly, comparator 340 may select information listed in both user A's profile and user B's profile. For example, comparator 340 may select a common favorite book, favorite movie, favorite band, favorite television show, favorite game, hobby, interest, activity, political view, religious view, philosophy, or any other information listed in a user profile.

In one embodiment, comparator 340 selects event information common to both user A and user B. For example, comparator 340 may select an event scheduled through the social networking system 220 that both users were invited to, RSVP'd to, or attended. In one embodiment, comparator 340 selects location information common to both user A and user B. For example, comparator 340 may select a location that both users checked in at using client devices with location-detection functionality (such as a mobile phone with GPS capability). If both users checked in at a store, a park, a bar, or any other common location, comparator 340 may select the location. Further, comparator 340 may select location information in conjunction with time information. For example, if two users checked in at an event, such as a concert or a sporting event, between the times that the event was known or anticipated to occur, comparator 340 may select the commonly attended event.

In one embodiment, comparator 340 selects social networking system objects that both user A and user B have interacted with, endorsed, "liked", played, accessed, or commented on. For example, if both users have commented on or shared a note uploaded by a prominent politician, comparator 340 may select the prominent politician, the note uploaded by the politician, or the concept "politician." In one embodiment, comparator 340 selects a social networking system object external to the social networking system 220 with which both user A and user B have interacted. For example, comparator 340 may select an external website visited by both users, or may select an article or content item hosted by an external website viewed by both users. Any interaction by both users with an object represented by the social networking system 220, internal or external to the social networking system 220, may be selected by comparator 340.

Friendship page module 350 receives relationship data selected by comparator 340. Friendship page module 350 generates a social networking system page containing the relationship data (the "friendship page") and displays the page to a user of social networking system 220, for example the requesting user 300. The format of the friendship page 140 may depend on the client device 210 of the requesting user 300. In one embodiment, the friendship page 140 is a web page displayed within the social networking system GUI viewable with a web browser. In an alternative embodiment, the friendship page 140 is a social networking system page viewable within the social networking system GUI of a native application, such as a mobile phone.

Friendship page module 350 may additionally format or organize relationship data within the friendship page 140. In one embodiment, friendship page module 350 displays relationship data within the friendship page 140 according to the relationship data object or interaction type. For example, friendship page module 350 may display pictures in the top margin of friendship page 140, biographical information and common friends in the left margin of the friendship page 140, and the remainder of the relationship data in the body of friendship page 140. In one embodiment, relationship data within the friendship page 140 is organized and displayed chronologically. For example, the most recently created relationship data may be displayed at the top of friendship page 140. Relationship data may also be organized chronologically by object or interaction type. For example, pictures may be displayed in the top margin of friendship page 140, and may be organized chronologically, with the most recently interacted with or uploaded pictures being displayed first.

In one embodiment, relationship data is organized by relevance. Organizing relationship data by relevance may comprise analyzing characteristics of relationship data and determining based on this analysis which relationship data is the most relevant to either requesting user 300, user A, user B, or any other social networking system user. In one embodiment, relevance is determined based on pre-set formulations. Factors that may affect the relevance of relationship data include the number of social networking system users tagged in an object, the number of comments on an object, the number of times an object is "liked", the time communications were sent, the type of the relationship data, or any other characteristic of the relationship data.

A social networking system user's profile page may prominently display a picture of the user (a "profile picture"), for example in the upper-left corner of the profile page. In one embodiment, a profile picture is selected by friendship page module 350 for prominent display on friendship page 140. The friendship page profile picture may be a picture determined to be most relevant to user A and user B among a set of pictures in the relationship data received by friendship page module 350. In one embodiment, if only user A and user B have been tagged in a picture, it is considered relevant for the purposes of selecting a friendship page profile picture. Likewise, if additional users have been tagged in the picture, it may be considered less relevant for the purposes of selecting a friendship page profile picture. Additional factors affecting relevance include the number of comments on the picture, the number of times the picture has been "liked," and image characteristics of the picture, including resolution, facial recognition, focus, brightness and size. In one embodiment, friendship page 140 comprises the same format as a user profile page, and the selected friendship page profile picture for is displayed in the same page location as a profile picture for a profile page.

In one embodiment, friendship page module 350 generates friendship pages subject to universal social networking system privacy rules. For example, social networking system 220 may only allow friendship module 350 to generate a friendship page 140 for a requesting user 300 and a social networking system friend of the requesting user 300. Alternatively, social networking system 220 may allow friendship module 350 to generate a friendship page 140 for two users so long as one or both are friends with the requesting user 300. In one embodiment, a user may designate in user privacy settings whether or not friendship page module 350 may generate a friendship page 140 between the user and another social networking system user. Likewise, a user may designate in user privacy settings a subset of social networking system users that may generate a friendship page 140 between the user and another user, or a subset of social networking system users for which a friendship page 140 with the user may be generated. A user may also designate in user privacy settings subsets of social networking system users that are able to view certain types of social graph objects within a friendship page 140. For example, a user may designate that all social networking system users may view communications, but only friends may view pictures. In such an example, friendship page module 350 may generate a friendship page 140 displaying pictures for friends, but may generate a friendship page 140 omitting pictures for non-friend users.

In one embodiment, friendship page module 350 may generate a friendship page 140 between three or more social networking system users. In such an embodiment, social graph data for each of the users is retrieved, and social graph data common to all of the users is selected by comparator 340. In one embodiment, friendship page module 350 may generate a friendship page 140 between a social networking system user and a non-person social networking system user, such as a social networking system page, group, or company. In such an embodiment, social graph data for the user and the non-person user is retrieved, and social graph data common to both the user and the non-person user is selected by comparator 340.

In one exemplary embodiment, a friendship page 140 is generated between a person and a non-person entity. For example, a friendship page 140 may be generated between a coffee shop and a user who frequents the coffee shop. Comparator 340 may select photos of the user at the coffee shop, events at the coffee shop attended by the user, times when the user checked in to the coffee shop using a device with location-detection, friends of the user who are fans of the coffee shop or who have checked in to the coffee shop, or other social graph information common to the user's node and the coffee shop's node. Friendship page module 350 may generate a friendship page 140 for the user and the coffee shop, and may select a photo of the user at the coffee shop for prominent display on the friendship page 140.

Figure 5:
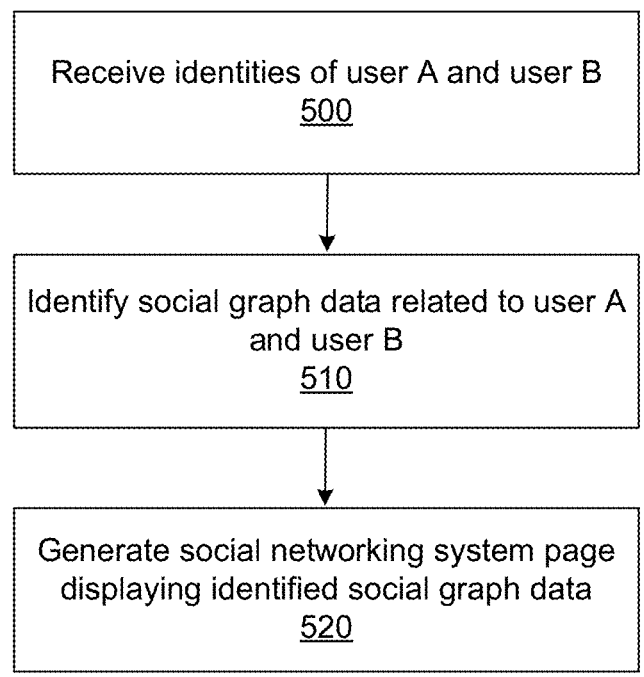
FIG. 5 is a flow chart illustrating a process for producing a social networking system page containing relationship data for identified social networking system users, according to one embodiment.

FIG. 5 is a flow chart illustrating a process for producing a social networking system page containing relationship data for identified social networking system users, according to one embodiment. The identities of two users, user A and user B, are received 500. Social graph data common to user A and user B is identified 510. A social networking system page is then generated 520 displaying the identified social graph data common to user A and user B.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   maintaining in a data store social information associated with a plurality of users of a social networking system, a plurality of actions performed by the users, and a plurality of social networking system objects associated with one or more of the actions;
   receiving, from a device associated with a viewing user, a request for a page, the request identifying two or more users of the social networking system, the requested page comprising one or more social networking system objects upon which, for each object, an action was performed by each of the identified social networking system users; and
   responsive to receiving the request for the page:
      identifying one or more social networking system objects wherein, for each identified object, an action was performed by each of the identified users with respect to the social networking system object;
      determining an order for the identified social networking system objects;
      identifying a set of images, each image from the set of images associated with each of the identified users;
      selecting an image from the set of images based on a relevancy of the image to all of the identified users, wherein the relevancy of the image decreases when the image is associated with additional users other than the identified users;
      generating the requested page, the generated page including information associated with the identified social networking system objects, the actions performed on each of the social networking system objects by each of the identified users, the information ordered within the generated page based on the determined order for the identified social networking system objects, and the selected image; and
      sending the generated page to the device associated with the viewing user for display.

2. The computer-implemented method of claim 1, further comprising:
   obtaining, from the data store, social information associated with the performed actions;
   wherein the page further contains the obtained social information associated with the performed actions.

3. The computer-implemented method of claim 2, wherein a performed action comprises an interaction associated with each of the identified users.

4. The computer-implemented method of claim 2, wherein obtaining social information associated with the performed actions comprises obtaining stored communications associated with all the identified users.

5. The computer-implemented method of claim 1, wherein a performed action comprises an interaction by an identified user with the identified object.

6. The computer-implemented method of claim 1, wherein the identified social networking system object comprises an image in which each of the identified users is tagged.

7. The computer-implemented method of claim 1, further comprising:
   retrieving at least one social networking system privacy rule for at least one identified user;
   wherein generating the requested page comprises restricting the obtained social information based on the at least one retrieved privacy rule.

8. The computer-implemented method of claim 1, wherein the generated page comprises a web page viewable with a web browser.

9. The computer-implemented method of claim 1, wherein the page comprises a page viewable within a native application.

10. The computer-implemented method of claim 1, wherein the identified social networking system object comprises a video in which each of the identified users is tagged.

11. The computer-implemented method of claim 1, wherein the identified social networking system object comprises an event attended by all the identified users.

12. The computer-implemented method of claim 1, wherein the identified social networking system object comprises a social networking system user with which all the identified users have interacted.

13. The computer-implemented method of claim 12, wherein obtaining social information associated with the identified object comprises obtaining biographical information associated with the social networking system user.

14. The computer-implemented method of claim 1, wherein the identified social networking system object comprises a content item with which all the identified users have interacted.

15. The computer-implemented method of claim 1, wherein social information contained within the page is ordered according to recency.

16. The computer-implemented method of claim 1, wherein social information contained within the page is ordered according to relevancy.

17. The computer-implemented method of claim 1, wherein selecting the image based on the relevancy comprises selecting the image based on social networking system users identified in the image and actions taken by social networking system users associated with the image.

18. A non-transitory computer readable storage medium configured to store instructions configured to, when executed by a computer processor, cause the processor to:
maintain in a data store social information associated with a plurality of users of a social networking system, a plurality of actions performed by the users, and a plurality of social networking system objects associated with one or more of the actions;
receive, from a device associated with a viewing user, a request for a page, the request identifying two or more users of the social networking system, the requested page comprising one or more social networking system objects upon which, for each object, an action was performed by each of the identified social networking system users; and
responsive to receiving the request for the page:
identify one or more social networking system objects wherein, for each identified object, an action was performed by each of the identified users with respect to the social networking system object;
determine an order for the identified social networking system objects;
identify a set of images, each image from the set of images associated with each of the identified users;
select an image from the set of images based on a relevancy of the image to all of the identified users, wherein the relevancy of the image decreases when the image is associated with additional users other than the identified users;
generate the requested page, the generated page including information associated with the identified social networking system objects, the actions performed on each of the social networking system objects by each of the identified users, the information ordered within the generated page based on the determined order for the identified social networking system objects, and the selected image; and
send the generated page to the device associated with the viewing user for display.

19. A system comprising:
a computer processor; and
a non-transitory computer readable storage medium configured to store computer executable instructions configured to, when executed by the computer processor, cause the processor to:
maintain in a data store social information associated with a plurality of users of a social networking system, a plurality of actions performed by the users, and a plurality of social networking system objects associated with one or more of the actions;
receive, from a device associated with a viewing user, a request for a page, the request identifying two or more users of the social networking system, the requested page comprising one or more social networking system objects upon which, for each object, an action was performed by each of the identified social networking system users; and
responsive to receiving the request for the page:
identify one or more social networking system objects wherein, for each identified object, an action was performed by each of the identified users with respect to the social networking system object;
determine an order for the identified social networking system objects;
identify a set of images, each image from the set of images associated with each of the identified users;
select an image from the set of images based on a relevancy of the image to all of the identified users, wherein the relevancy of the image decreases when the image is associated with additional users other than the identified users;
generate the requested page, the generated page including information associated with the identified social networking system objects, the actions performed on each of the social networking system objects by each of the identified users, the information ordered within the generated page based on the determined order for the identified social networking system objects, and the selected image; and
send the generated page to the device associated with the viewing user for display.

* * * * *